Patented Oct. 5, 1948

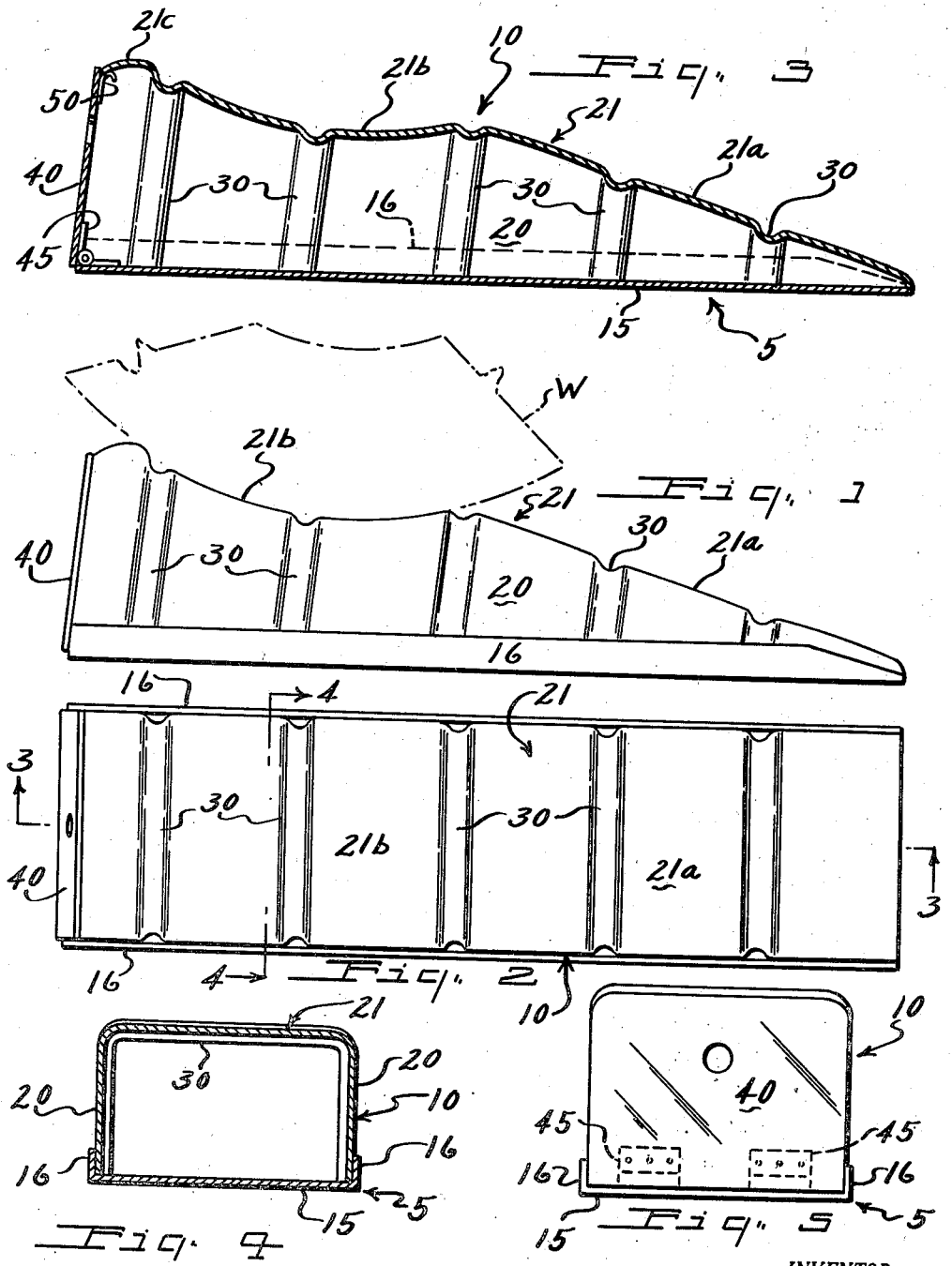

2,450,648

UNITED STATES PATENT OFFICE 2,450,648

VEHICLE LIFT

Joseph Felzer, Los Angeles, Calif.

Application December 22, 1945, Serial No. 636,906

2 Claims. (Cl. 254—88)

My present invention has to do with vehicle lifts, having more particularly to do with improvements in the drive-on type of lift embodying an inclined portion providing a surface along which the vehicle is rolled until it is sufficiently elevated, and having a recess in its highest portion to somewhat conform to the curvature of the wheel.

While I am aware that lifts of this general character have been proposed, they have been impracticable for general usage, because their construction and design have been such as to render them impracticably costly and objectionably heavy in order to accomplish sufficient structural strength to support the substantial weight of a vehicle such, for instance, as an automobile or truck.

It is therefore an object of my present invention to provide a simple and efficient lift of this character which not only possesses great structural strength but is extremely light weight and may be economically manufactured.

Another object of my invention is to provide a device of this character which is hollow and whose interior is entirely unobstructed by braces or the like, thus rendering the interior of the device usable as a tool box.

My invention has other advantages and objects which will become apparent from the following description of a presently preferred embodiment. I wish it understood, however, that the following description is intended merely as explanatory and is not to be considered as limitative upon the broader scope of the invention except as may be indicated in the accompanying claims.

In the ensuing description, I shall refer to the accompanying drawings, in which:

Fig. 1 is a side elevation showing in dotted lines a fragment of an automobile wheel mounted thereon;

Fig. 2 is a top plan view;

Fig. 3 is a longitudinal section taken on line 3—3 of Fig. 2;

Fig. 4 is a cross section taken on line 4—4 of Fig. 2; and

Fig. 5 is a rear or left-hand end view.

Referring now to the drawings, I show a preferred form of my device as comprising generally a base 5 and a body 10.

The base 5 is preferably made of a metal stamping having a bottom wall 15 and side walls 16.

The body 10 is likewise preferably made of a metal stamping, being U-shaped in cross-section and having opposite side walls 20 and a top wall 21.

The top wall has an inclined front portion 21a, which inclines to about midway of the top wall and is then downwardly curved to present a wheel-receiving recess 21b generally conforming to the curavture of a wheel W, such as shown in dot-dash lines in Fig. 1. The back end portion 21c of the top wall curves downwardly at its extreme end so that if a wheel should accidentally roll over said end, the front end of the device will not be tipped or moved off the ground. The side walls 20 fit between the side walls 16 of the base, being secured thereto in any suitable manner as by spot welding not shown.

I find that by providing inwardly embossed longitudinally spaced channels 30 which extend across the top wall 21 and thence downwardly of the side walls to the bottom edge thereof, I am able to use relatively light gauge metal without any interior bracing whatsoever, such particular arrangement of channeling not only preventing collapse of the side walls under the weight of a vehicle but also preventing the top wall from bending inwardly under such weight, which bending would cause the side walls to be drawn towards each other at their top ends.

With the foregoing described construction I am able to leave the interior of the device entirely unobstructed by bracing and the like, so that it may be used to contain tire tools, and the like. For this purpose I provide, at the open rear end of the device, a door 40 swingably mounted on the base by means of hinge members 45, here shown as two in number. To releasably secure the door in closed position I provide a leaf spring latch 50 secured at one end to the inside of the door and curved at its opposite end to yieldably engage under the curved portion 21c of the top wall.

I claim:

1. A drive-on type vehicle lift comprising a base member having a bottom wall and upright side walls, a U-shaped body having side walls secured between the side walls of the base and having a top wall inclining from the front end of the base to a point substantially midway between its ends and thence curving downwardly, upwardly and downwardly, a door swingably mounted on the rear end of the base in position to close the rear end of the body, and a leaf spring latch secured to the door and having a curved free end resiliently engageable under the rear end of the body top wall.

2. A drive-on type vehicle lift comprising a base member having a bottom wall and upright side walls, a U-shaped body having side walls secured between the side walls of the base and having a top wall inclining from the front end of the base to a point substantially midway between its ends and thence curving downwardly, upwardly and downwardly, a door swingably mounted on the rear end of the base in postion to close the rear end of the body, and a leaf spring latch secured to the door and having a curved free end resiliently engageable under the rear end of the body top wall, said body being further characterized by having longitudinally spaced inwardly embossed channels extending vertically of its side walls and across the top wall.

JOSEPH FELZER.

REFERENCES CITED

The following references are of record in the file of this patent:

UNITED STATES PATENTS

| Number | Name | Date |
| --- | --- | --- |
| 1,448,250 | Au-Miller | Mar. 13, 1923 |
| 1,970,172 | Hull | Aug. 14, 1934 |
| 2,272,334 | St. Laurent | Feb. 10, 1942 |